No. 872,883. PATENTED DEC. 3, 1907.
E. G. ADAMS.
LOCKING MEANS.
APPLICATION FILED MAR. 23, 1907.
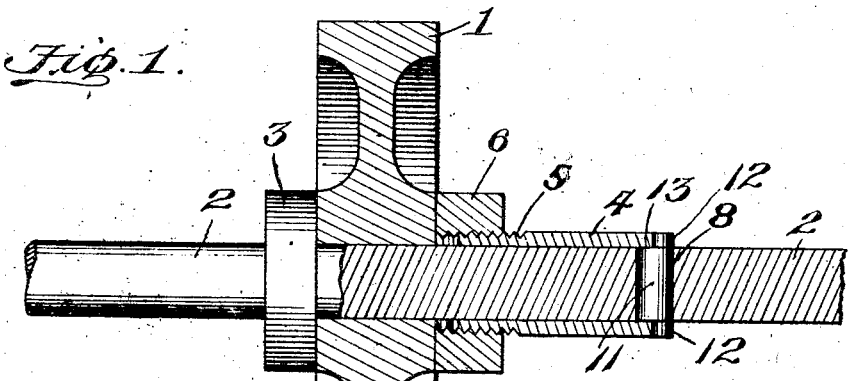
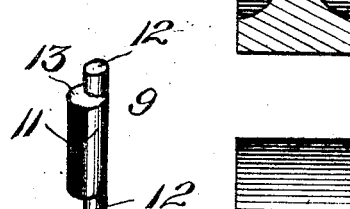
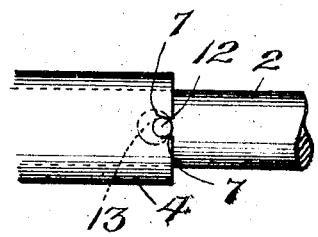
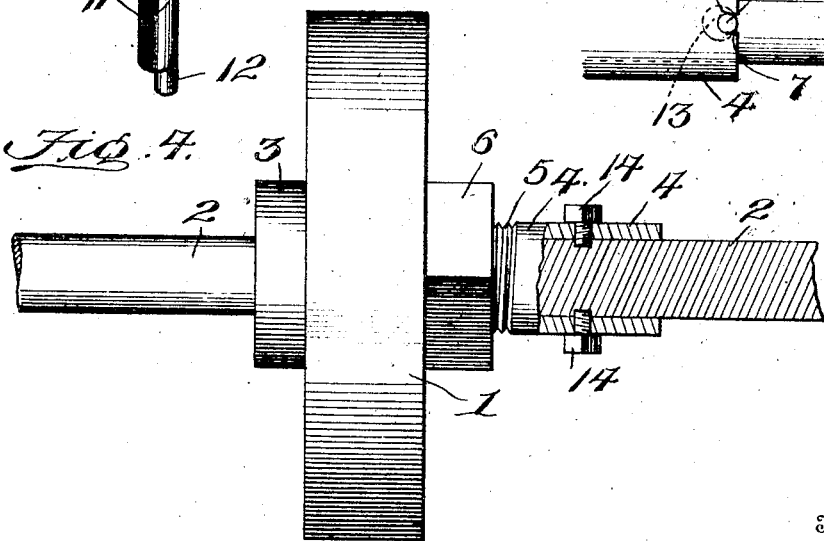
Witnesses
J. T. L. Wright
D. W. Gould
Inventor
Edwin G. Adams,
By Victor J. Evans
Attorney

UNITED STATES PATENT OFFICE.

EDWIN G. ADAMS, OF NEAR PLAIN CITY, OHIO.

LOCKING MEANS.

No. 872,883.   Specification of Letters Patent.   Patented Dec. 3, 1907.

Application filed March 23, 1907. Serial No. 364,121.

*To all whom it may concern:*

Be it known that I, EDWIN G. ADAMS, a citizen of the United States, residing near Plain City, in the county of Union and State of Ohio, have invented new and useful Improvements in Locking Means, of which the following is a specification.

The invention relates to an improved locking means for securing an element upon and in fixed relation to a shaft.

The main object of the present invention is the provision of a locking means including a member normally free in independent movement of the shaft, and a clamping member arranged for independent adjustment relative to said movable member, the construction including a means for securing the movable member in fixed position upon the shaft whereby to permit the adjustment of the clamping member with relation to the element to be secured upon the shaft.

The invention will be described in the following specification, reference being had particularly to the accompanying drawings, in which:—

Figure 1 is a view in longitudinal section partially in elevation, illustrating the application of my improvement, Fig. 2 is a plan of a portion of the same illustrating the means for securing the movable member on the shaft, Fig. 3 is a perspective of the locking pin, Fig. 4 is an elevation partly in section showing a modified securing means.

Referring particularly to the drawings, it will be noted that my improved securing means is primarily designed for securing desired elements, as the disk 1 in fixed relation upon a shaft 2, the latter being ordinarily provided with a stop 3 against which the element bears. The securing means comprises a sleeve 4 arranged for free longitudinal and revoluble movement upon the shaft, and hereinafter termed the movable member. One end of the sleeve is exteriorly threaded at 5 to receive a jam nut 6, the latter forming and being hereinafter referred to as the clamping member. The relatively forward edge of the sleeve, or that edge free of the threaded formation, is formed with diametrically opposed notches 7, and the shaft 2 is also formed with a diametrically extending circular opening 8.

A locking pin 9 is designed to coöperate with the shaft and engage the notches 7 in the sleeve, said pin being formed with a body 11 corresponding in sectional dimensions to the dimensions of the opening 8 and equal in length to the diameter of the shaft. The opposite ends of the body are provided with projecting studs 12 corresponding in sectional dimensions to the dimensions of the recesses 7 of the sleeve. As the studs 12 are of less diameter than the body 11, and are centrally offset from the center of the body, it is obvious that the shoulders 13 are formed in rear of the studs on the body ends, as clearly shown in Fig. 3.

In use the element 1 is position on the shaft in contact with the stop 3, after which the sleeve 4 is moved lengthwise the shaft to a position adjacent the element 1, the jam nut 6 being screwed inwardly to the full limit upon the sleeve. The pin 9 is then inserted in the opening 8 in the shaft, with the shoulders 13, which co-incide with the surface of the shaft, extending toward the element 1. The sleeve is then adjusted to engage the studs 12 in the notches 7, in which position it will be noted that the inner surface of the sleeve beyond the notches 7 rests upon the respective shoulders 13 of the body and prevents movement of the pin. The nut 6 is now adjusted longitudinally of the sleeve to cause the relatively forward face of the nut to bear against the proximate surface of the element 1 and tightly clamp the same between said nut and the stop 3. The element 1 may be readily removed by a reverse movement of the nut 6 and a longitudinal movement of the sleeve toward the element to permit disengagement and removal of the pin 9, thus freeing the sleeve for movement longitudinally of the shaft.

In Fig. 4 I have shown a slightly modified form of securing means in which the sleeve 4 is provided with diametrically opposed set screws 14 arranged to engage the shaft 2 at any desired point. The securing means provides a simple and effective device for fixing upon a shaft one or any number of elements, as 1, it being understood that the nut 6 may be so adjusted with relation to the sleeve as to provide the desired clamping action.

While preferring the detailed structure herein shown and described, it is to be understood that such changes and variations as may fall within the scope of the appended claims are to be considered as within the spirit of the present invention.

Having thus described the invention what is claimed as new, is:

1. A means for securing an element in fixed relation to a shaft comprising a member movable on the shaft and free of engagement with the element, a clamping member adjustable on the movable member, and a pin coöperating with the shaft and adapted to be engaged by the movable member to limit movement of the latter in one direction.

2. A means for securing an element in fixed relation to a shaft comprising a member movable on the shaft and free of engagement with the element, a clamping member adjustable on the movable member, and a pin coöperating with the shaft and adapted to be engaged by the movable member to limit movement of the latter in one direction, said movable member being arranged to secure the pin in fixed relation to the shaft.

3. A means for securing an element in fixed relation to a shaft comprising a member movable on the shaft and free of engagement with the element, a clamping member adjustable on the movable member, a pin coöperating with the shaft and adapted to be engaged by the movable member to limit movement of the latter in one direction, said movable member being arranged to secure the pin in fixed relation to the shaft, said pin being formed with shoulders to underlie the movable member when the latter is in engagement with the pin.

4. A securing means for maintaining an element in fixed relation to a shaft comprising a sleeve free of engagement with the element and arranged for free movement on the shaft, a clamping nut having threaded connection with the sleeve and adapted to engage the element, and a pin engaging the shaft and limiting the movement of the sleeve in one direction.

5. A securing means for maintaining an element in fixed relation to a shaft comprising a sleeve arranged for free movement on the shaft, a clamping nut having threaded connection with the sleeve and adapted to engage the element, and a pin mounted in an opening in the shaft and provided with projecting studs to engage notches formed in the sleeve.

6. A securing means for maintaining an element in fixed relation to a shaft comprising a sleeve arranged for free movement on the shaft, a clamping nut having threaded connection with the sleeve and adapted to engage the element, and a pin mounted in an opening in the shaft and provided with projecting studs to engage notches formed in the sleeve, said sleeve overlying a portion of the pin and retaining the latter in position in the shaft.

In testimony whereof, I affix my signature in presence of two witnesses.

EDWIN G. ADAMS.

Witnesses:
C. W. HORN,
JASPER CONVERS.